United States Patent
Pathak

(10) Patent No.: US 12,116,679 B2
(45) Date of Patent: Oct. 15, 2024

(54) DEVICE AND METHOD FOR LARGE SCALE HARVESTING OF SOLAR ENERGY THROUGH HYDROGEN PRODUCTION

(71) Applicant: Vivek Pathak, East Brunswick, NJ (US)

(72) Inventor: Vivek Pathak, East Brunswick, NJ (US)

( * ) Notice: Subject to any disclaimer, the term of this patent is extended or adjusted under 35 U.S.C. 154(b) by 337 days.

(21) Appl. No.: 17/146,390

(22) Filed: Jan. 11, 2021

(65) Prior Publication Data

US 2022/0228270 A1    Jul. 21, 2022

(51) Int. Cl.
| | |
|---|---|
| *C25B 1/04* | (2021.01) |
| *C10G 1/04* | (2006.01) |
| *C10L 1/04* | (2006.01) |
| *C25B 1/50* | (2021.01) |
| *C25B 9/05* | (2021.01) |
| *C25B 9/17* | (2021.01) |
| *C25B 9/65* | (2021.01) |

(Continued)

(52) U.S. Cl.
CPC ............... *C25B 1/04* (2013.01); *C10G 1/04* (2013.01); *C10L 1/04* (2013.01); *C25B 1/50* (2021.01); *C25B 9/05* (2021.01); *C25B 9/17* (2021.01); *C25B 9/65* (2021.01); *C25B 11/02* (2013.01); *C25B 15/081* (2021.01); *C25B 15/083* (2021.01); *H02S 10/40* (2014.12); *H02S 20/32* (2014.12); *H02S 30/20* (2014.12); *H02S 40/22* (2014.12); *H02S 40/44* (2014.12); *C10G 2300/1003* (2013.01); *C10L 2200/0461* (2013.01)

(58) Field of Classification Search
CPC ............................................. C25B 1/02–1/044
See application file for complete search history.

(56) References Cited

U.S. PATENT DOCUMENTS

| | | | | |
|---|---|---|---|---|
| 3,652,431 A | * | 3/1972 | Reynolds | C25B 1/04 205/628 |
| 4,002,552 A | * | 1/1977 | Bunn, Jr. | G05D 9/12 204/266 |

(Continued)

FOREIGN PATENT DOCUMENTS

| | | | | |
|---|---|---|---|---|
| FR | 2286891 A1 | * | 10/1974 | ............... C25B 1/04 |
| KR | 10-2009-0104504 | * | 10/2009 | ............... C25B 1/04 |

(Continued)

OTHER PUBLICATIONS

Machine translation of Imberteche (FR 2286891 A) (Year: 1976).*

(Continued)

*Primary Examiner* — Harry D Wilkins, III
(74) *Attorney, Agent, or Firm* — The Webb Law Firm

(57) ABSTRACT

Large scale exploitation of Solar energy is proposed by using floating devices which use solar energy to produce compressed hydrogen by electrolysis of deep sea water. Natural ocean currents are used to allow the devices to gather solar energy in the form of compressed hydrogen from over a large area with minimum energy transportation cost. The proposal uses a combination of well understood technologies, and a preliminary cost analysis shows that the hydrogen produced in this manner would satisfy the ultimate cost targets for hydrogen production and pave the way for carbon free energy economy.

6 Claims, 6 Drawing Sheets

Open underwater electrolytic cell

(51) Int. Cl.
    *C25B 11/02*     (2021.01)
    *C25B 15/08*     (2006.01)
    *H02S 10/40*     (2014.01)
    *H02S 20/32*     (2014.01)
    *H02S 30/20*     (2014.01)
    *H02S 40/22*     (2014.01)
    *H02S 40/44*     (2014.01)

(56) References Cited

U.S. PATENT DOCUMENTS

| | | | | |
|---|---|---|---|---|
| 4,136,004 | A * | 1/1979 | Kamarian | C25B 9/19 |
| | | | | 204/266 |
| 4,216,067 | A * | 8/1980 | Mitchell | C25B 1/04 |
| | | | | 205/628 |
| 4,235,693 | A * | 11/1980 | Rowe | H01M 8/0656 |
| | | | | 204/278 |
| 4,490,232 | A * | 12/1984 | Lapeyre | H02K 7/1853 |
| | | | | 290/42 |
| 6,890,410 | B2 * | 5/2005 | Sullivan | C25B 1/04 |
| | | | | 204/266 |
| 9,315,397 | B2 | 4/2016 | Sivret | |
| 10,411,643 | B2 | 9/2019 | Smadja et al. | |
| 10,840,572 | B1 | 11/2020 | Luz | |
| 2004/0108203 | A1 * | 6/2004 | Sullivan | C25B 9/23 |
| | | | | 204/276 |
| 2004/0217017 | A1 * | 11/2004 | Kidwell | G01N 27/3335 |
| | | | | 205/792 |
| 2007/0173141 | A1 * | 7/2007 | Hine | B63H 25/04 |
| | | | | 440/13 |
| 2010/0111783 | A1 * | 5/2010 | Severinsky | C25B 15/08 |
| | | | | 422/600 |
| 2010/0213052 | A1 * | 8/2010 | McAlister | C25B 1/04 |
| | | | | 204/266 |
| 2010/0280135 | A1 * | 11/2010 | Doty | C01B 3/36 |
| | | | | 518/703 |
| 2012/0242275 | A1 * | 9/2012 | Kokusho | H02S 20/00 |
| | | | | 136/246 |
| 2014/0079593 | A1 * | 3/2014 | Naito | B01J 19/0046 |
| | | | | 422/111 |
| 2019/0367387 | A1 * | 12/2019 | Gwon | C25B 1/04 |

FOREIGN PATENT DOCUMENTS

| | | | | |
|---|---|---|---|---|
| WO | WO 2006/077999 | A1 * | 7/2006 | C25B 1/04 |
| WO | 2015163932 | A1 | 10/2015 | |

OTHER PUBLICATIONS

Machine translation of Kubo (WO 2006/077999 A) (Year: 2006).*

Machine translation of Lee et al (KR 10-2009-0104504 A) (Year: 2009).*

Karthikeyan et al, Pretreatment of food waste for methane and hydrogen recovery: A review, Bioresource Technology, vol. 249, Feb. 2018, pp. 1025-1039 (Year: 2018).*

An Evaluation of the U.S. Department of Energy's Marine and Hydrokinetic Resource Assessments (available online at http://nap.nationalacademies.org/18278, ISBN 978-0-309-26999-5 | DOI 10.17226/18278).

Hanson, H. P., Bozek, A. and Duerr, A. E. S., (2011), The Florida Current: A Clean but Challenging Energy Resource, Eos Trans. AGU, 92(4), 29. (https://doi.org/10.1029/2011EO040001).

* cited by examiner

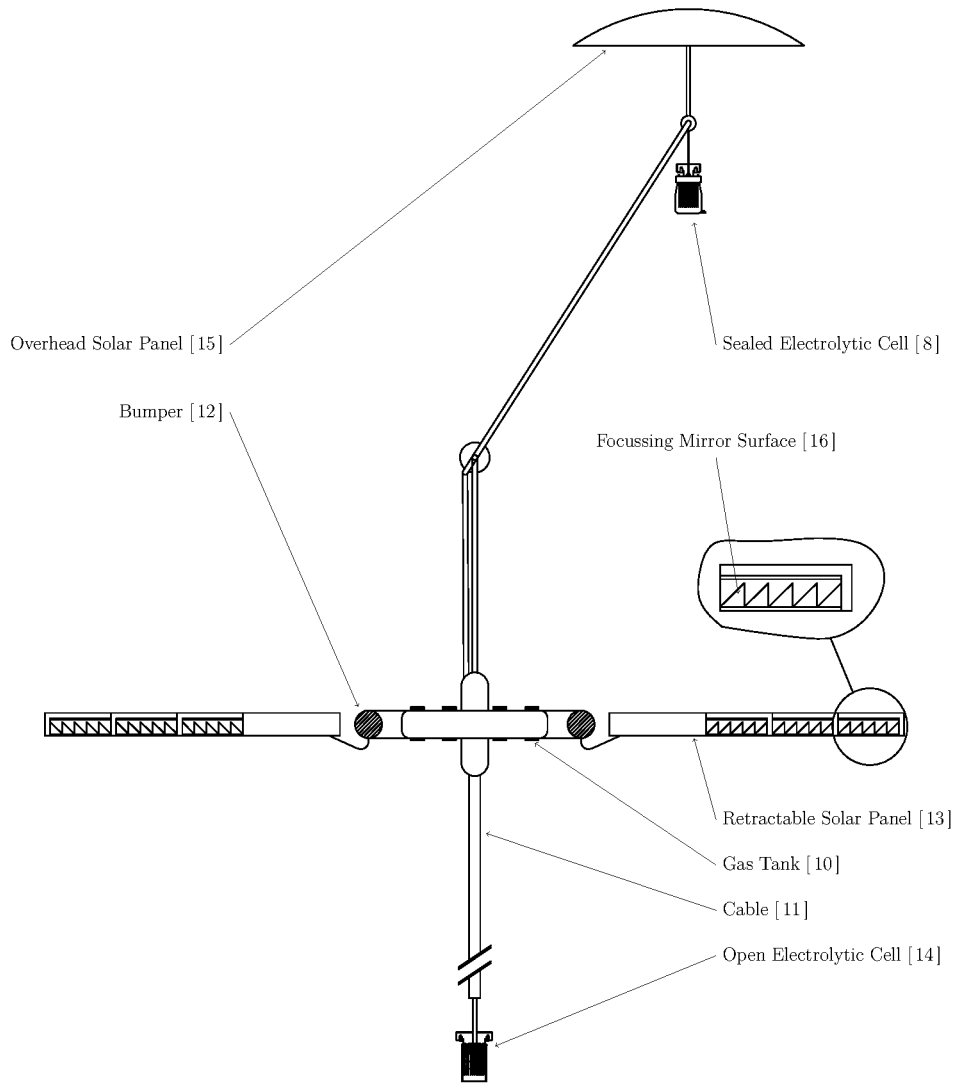
Figure 1: Floating solar platform side view bent for solar tracking

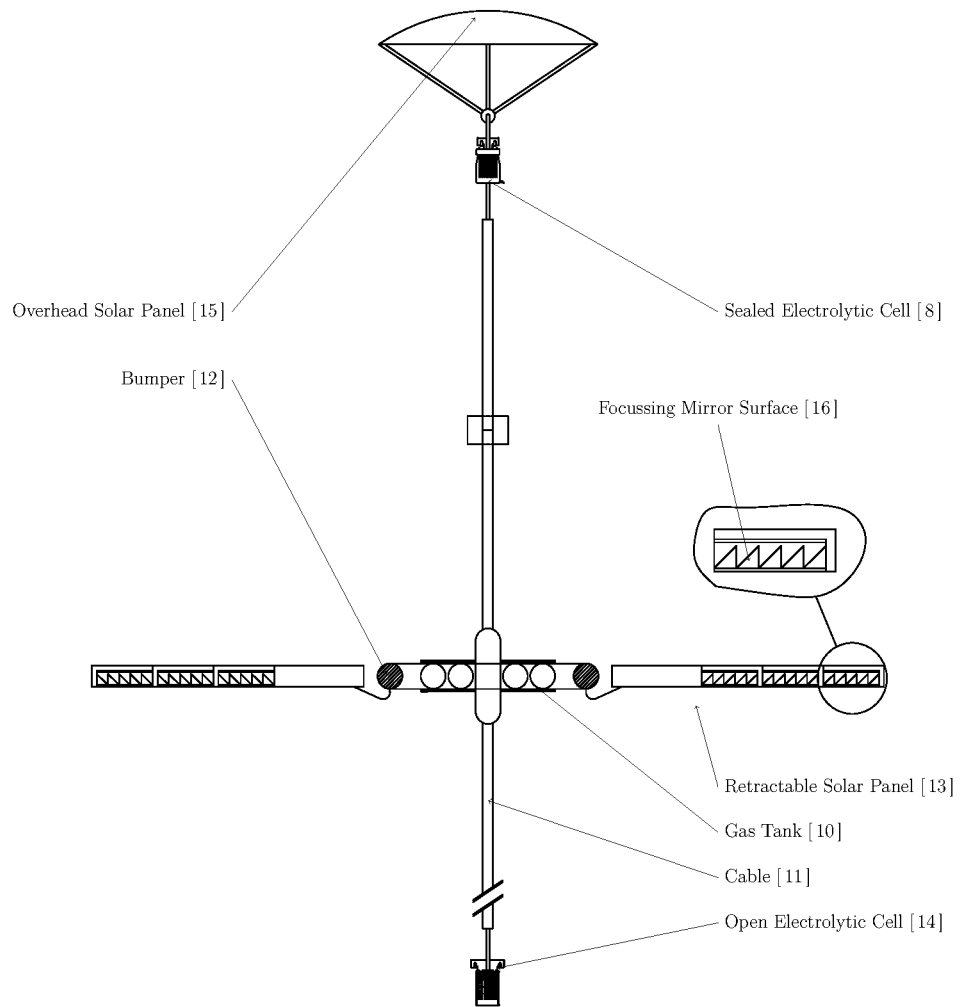
Figure 2: Floating solar platform upright side view

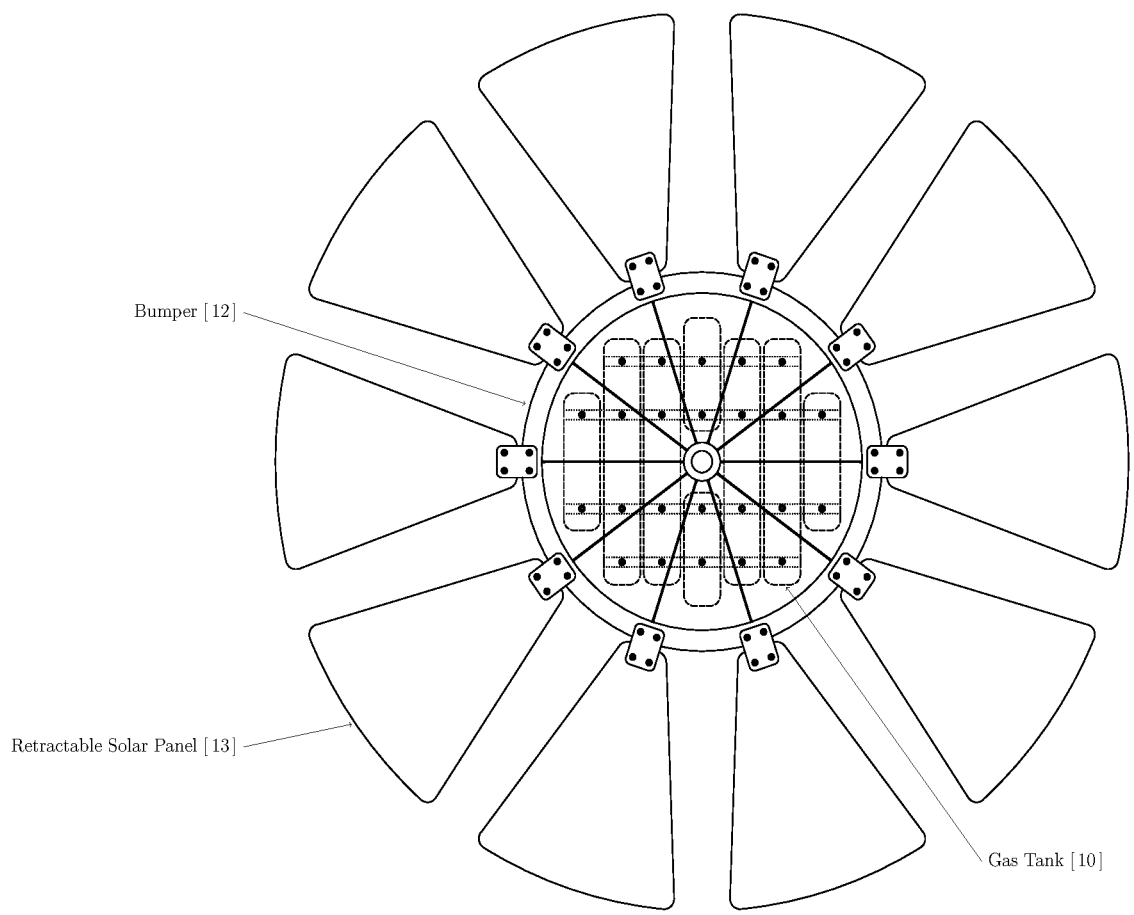
Figure 3: Floating solar platform top view

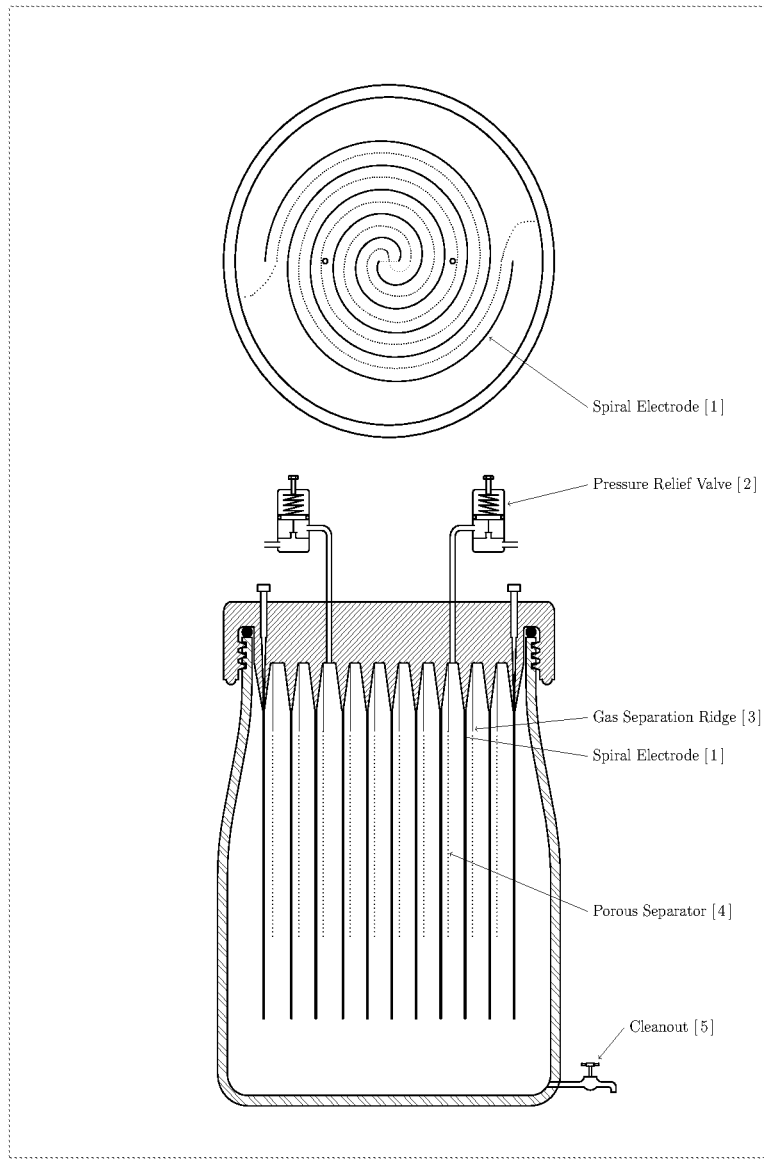
Figure 4: Sealed high pressure electrolytic cell

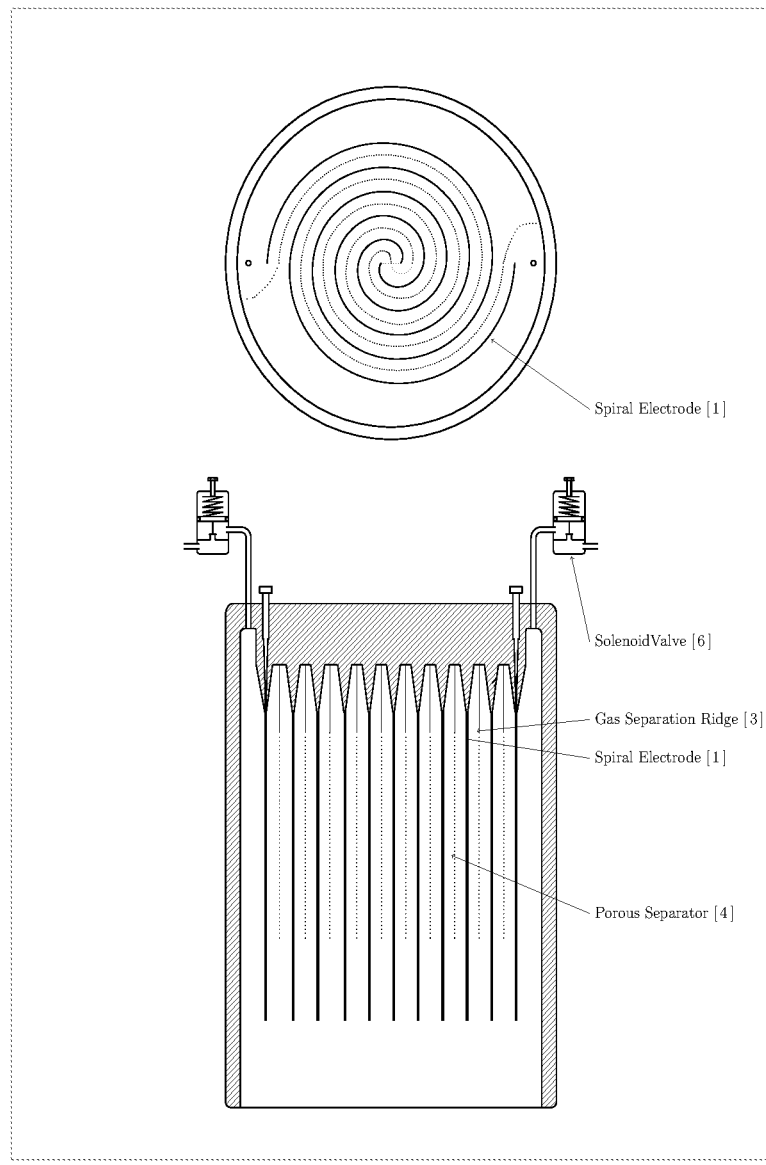
Figure 5: Open underwater electrolytic cell

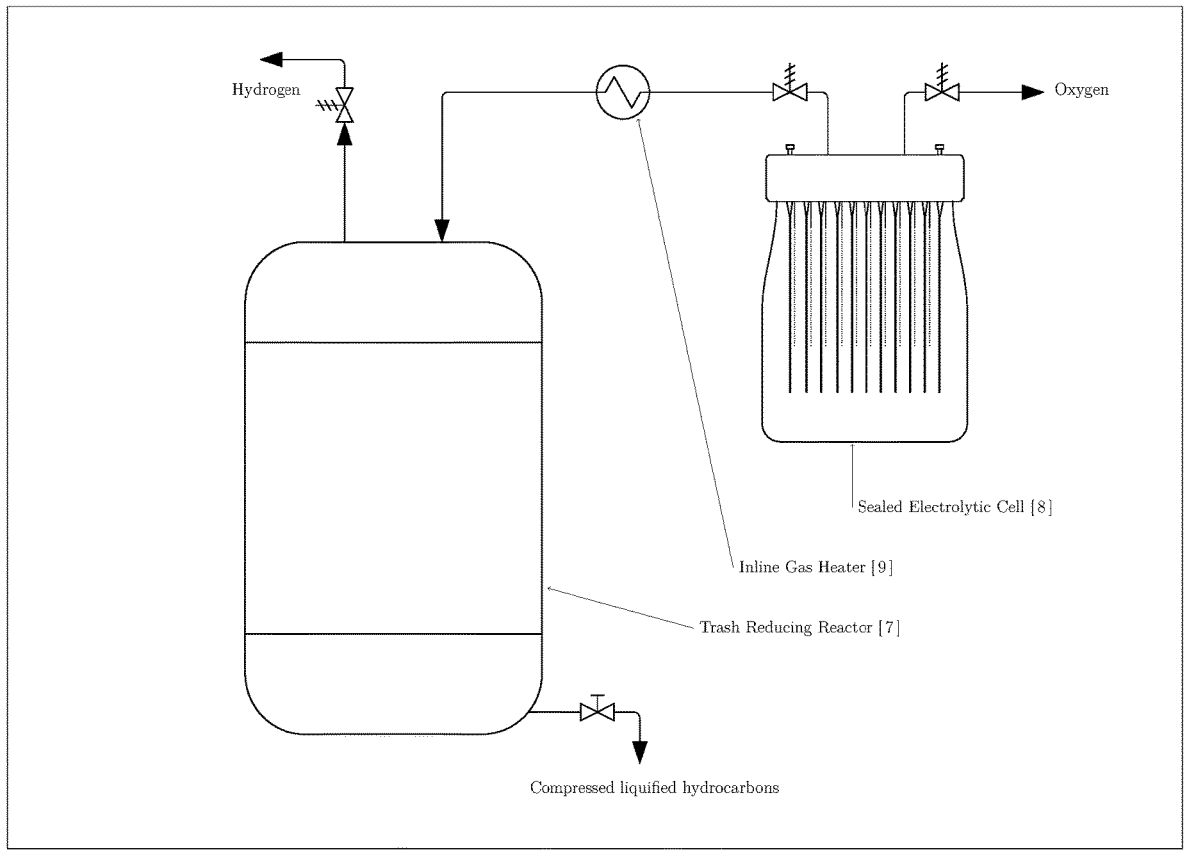
Figure 6: Electrolytic cell with hydrogen reduction recycling

DEVICE AND METHOD FOR LARGE SCALE HARVESTING OF SOLAR ENERGY THROUGH HYDROGEN PRODUCTION

CROSS-REFERENCE TO RELATED APPLICATIONS

This application claims the benefit of U.S. Provisional Application No. 62/959,957 filed Jan. 11, 2020.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Large scale and cost effective harvesting and storage of solar energy is still an open problem. A number of approaches are being attempted with the ultimate objective of supporting large scale industrially and commercially viable solar energy harvesting technologies which could enable a massive shift away from hydrocarbon fuels. This in turn would reduce the production of greenhouse gas, and thus combat global warming.

Adoption of solar power for transportation and industrial usage requires addressing the lower energy density and the inherent unreliability of solar power, which make it less suitable for transportation and industrial usage, unless storage can smooth out the unavailability caused by intermittent nature of incoming solar energy. The low energy density of sunlight requires a large collection area. If large geographical areas are used for solar energy production, then there is a problem of transporting the energy to where it is needed. Transporting the harvested solar energy to the point of consumption additionally expends energy. Thus the effective yield of harvested energy is reduced. Improving the efficiency of storage and transportation is therefore of paramount importance in solar energy harvesting.

Among the upcoming non-carbon based fuels, hydrogen is well matched to the existing transportation infrastructure. Given a cost-effective and large scale supply of compressed hydrogen fuel, it is feasible to rapidly migrate out of gasoline and diesel in a non-disruptive manner. Among the recent attempts at extracting oceanic solar energy, extracting hydrogen from water for energy usage, the following are salient:

U.S. Pat. No. 9,315,397B2 by Samuel Sivret proposes electrolysis of sea water at depth to create hydrogen and oxygen. A stationary system of pumps and turbines is used to generate hydrogen and oxygen by electrolysis of water. Having a fixed infrastructure approach limits the total energy one can gather from the invention unless a cheap and abundant power supply source is assumed.

International patent WO2015163932A1 by Joseph P. BOWER proposes electrolysis of water under pressure within a fixed chamber to generate hydrogen by electrolysis of water. Again a fixed infrastructure approach makes it unsuitable for application in solar energy harvesting.

U.S. Ser. No. 01/041,1643 by Smadja et. al. describes floating solar arrays with ability to orient the solar cells to improve the efficiency of photovoltaic generation of electricity. Having moving parts that need continuous solar tracking makes the approach less pragmatic for large ocean environment, which would be required if significant amount of hydrogen has to be generated.

U.S. Ser. No. 01/084,0572 by Denis Luz addresses the storage aspect by converting solar energy into compressed hydrogen for later use. However the approach is one of a fixed infrastructure making it cumbersome to gather solar energy from over a large geographical area.

OBJECTS OF THE INVENTION

Support compressed hydrogen based harvesting of solar energy, thereby making solar energy accessible for industrial and transportation usages.

Collect solar energy over large areas by harvesting solar energy falling over the oceans. Use ocean currents in order to minimize the transportation cost.

BRIEF SUMMARY OF THE INVENTION

The present invention, in general terms, provides solar powered hydrogen from the ocean or other convenient water body. A hydrogen generation device floats on the water body surface and has attached solar panels generating electricity. The device is designed to withstand rough ocean conditions and is expected to be away for several months at a time when it generates the solar energy and stores it as compressed hydrogen.

The hydrogen production device, has a floating platform with positive buoyancy so that it can carry load of the other constituent parts. The device also has onboard array of sea worthy solar panels. These panels can be retracted into a tucked-away position where they will remain mechanically closed and submerged under the water surface in order to protect them from rough weather conditions. The solar panels directly convert the solar energy into electricity to be used by rest of the device. Optionally, the panels are reflective and have a focusing saw mirror pattern so as to collect the unused reflected solar energy for additional harvesting light energy through a solar panel and harvesting heat energy through high temperature electrolysis.

The electricity harvested by the solar panel is routed to an electrolytic cell that operates at a considerable depth under the ocean surface in order to produce the hydrogen compressed at the ambient water pressure present at the depth of operation. The electricity is also optionally used for high pressure high temperature electrolysis in a sealed electrolytic cell.

The compressed hydrogen produced by the electrolytic cell(s) is collected in compressed hydrogen storage tanks which also provide buoyancy to the device. The device also has an on-board computer system and electrical motors to do various operational tasks. Tasks include actions like folding up and submerging the solar panels for bad weather or dark conditions, or navigating on the sea surface by operating propellers. These operate either by drawing some power from the on-board solar panels, or by using batteries during dark conditions. The on-board computer will have visual and other sensors and will be designed to both remote control the system as well as to operate it autonomously without human intervention for long periods of time.

BRIEF DESCRIPTION OF THE DRAWINGS

Non-limiting embodiments of the present invention are described by way of example with reference to the accompanying figures, which are schematic and are not intended to be drawn to scale. In the figures each identical or approximately identical component is represented by a numeral. For purposes of clarity not every component is labeled in every figure, nor is every component of every embodiment of the invention shown where illustration is not necessary to allow a person of ordinary skill in the art to understand and build the invention. The figures are the following:

FIGS. 1 and 2 show the different side views of the device converting solar energy into compressed hydrogen. FIG. 3 shows the top view of the same.

FIG. 4 shows the top view and the side view of the sealed high pressure electrolytic cell.

FIG. 5 shows the open electrolytic cell which operates under hydrostatic pressure.

FIG. 6 outlines the hydrocarbon pathway that uses the heated compressed hydrogen for converting waste into useful fuel gases.

DETAILED DESCRIPTION OF THE PREFERRED EMBODIMENTS

The sketch in FIG. 1 shows an exemplary arrangement of the preferred embodiment for the invention. The device has one or more cylindrical buoys which also serve as Gas Tank [10] and are referred as such in the remaining discussion. The Gas Tank [10] stores the hydrogen produced by the device. There is an attachment on one side for the submerged payload which is attached to the buoy. The platform has an upright pole on the other end which rises above the water level and serve as a mount point for the Sealed Electrolytic Cell [8] (see FIG. 4) as well as commercially sourced radio antennae, sensors, and cameras.

One potential embodiment of the platform is in the form of a cylindrical buoy with a buoyancy of 5000 kg. The volume of such a buoy is approximated below by using a cylinder instead of the spherical end of the buoy. Similarly, density of 1.0 kg l$^{-1}$ is used instead of the density of sea water which can vary with temperature and salinity.

$$V = \frac{5000 \text{ kg}}{10 \text{ kg l}^{-1}} = 5000 \text{ l} \quad (1)$$

The cylinder can have a radius of 0.8 m which gives the height of cylinder to be 2.486 m. Construction of ocean-worthy buoys is a well developed standardized industrial process. This embodiment proposes to use a buoy made with 10 mm stainless steel sheet with standard processes.

The weight of such a buoy is approximated using the surface area of the cylinder and using 8000 kg m$^{-3}$ as the density of steel. The buoy weighs approximately 1160 kg, and has sufficient buoyancy to carry a payload of 3839 kg, as shown in

TABLE 1

Steel buoy design (representative)

| Component | Description with units (SI) | Value |
|---|---|---|
| Buoy | Volume (liters) | 5000.000 |
|  | Radius (m) | 0.800 |
|  | Height (m) | 2.487 |
|  | Curved area (square meter) | 12.500 |
|  | Flat area (square meter) | 2.011 |
|  | Total surface area (square meter) | 14.511 |
|  | Thickness of steel (m) | 0.010 |

TABLE 1-continued

Steel buoy design (representative)

| Component | Description with units (SI) | Value |
|---|---|---|
|  | Volume of steel skin (cubic meter) | 0.145 |
|  | Density of steel (kg/cubic meter) | 8000.000 |
|  | Weight of buoy (kg) | 1160.849 |
|  | Carrying capacity (kg) | 3839.151 |

Table 1. Positive buoyancy is achievable with a number of combinations of buoy parameters and payload weight.

The entire device is expected to float on the ocean surface while at the same time being dragged in ocean currents by virtue of the drag felt on the Cable [11] and the Gas Tank [10]. These devices shall be placed in those areas of the ocean where the ocean currents naturally form a loop. Fortunately, many such ocean current systems exist. Using the ocean current allows one to collect solar power from over a large area as well as to transfer it cost-free to a convenient collection location.

In order to keep the device on its desired trajectory, the floating platform also has navigational capability. This is effected either through commercially available on-board computer control, or through commercially available remote control by human operators. This requires propulsion and control, GPS capability, cameras, and other standard navigation and communication devices. Since these are well developed technologies, we will use existing prior art to add these capabilities to the device.

TABLE 2

Physical Properties of Compressed Hydrogen

| Component | Description with units (SI) | Value |
|---|---|---|
| Quantity of Hydrogen | 1 atmosphere in N per sq m. | 101325 |
|  | Pressure of hydrogen in atmospheres | 400 |
|  | Pressure (N per sq m) | 40530000 |
|  | Volume of Tank (cubic m) | 0.1 |
|  | Absolute temp of deep sea (K) | 275 |
|  | Molar gas constant R (J/kg K) | 0.167 |
|  | Number of moles of gas in the cylinder i.e. Volume of tank above, as per the gas law: n = PV/RT | 88133.316 |
|  | Mass of one mole of H2 (kg) | 0.002 |
|  | Mass in kg of compressed H2 in the cylinder | 177.666 |
| Buoyancy of the tank | Volume of water displaced by tank (cubic meter) | 0.100 |
|  | Density of deep sea water (kg per cubic meter) | 1055.000 |
|  | Weight of water displaced | 105.500 |
|  | The weight already provided by compressed hydrogen | 177.666 |
|  | Effective weight H2 contained in the cylinder (kg) | 72.166 |
| Energy content | Hydrogen combustion energy (MJ/kg) | 141.800 |
|  | Mass of hydrogen in tank (kg) | 177.666 |
|  | Total energy from 100 L tank (MJ) | 25193.065 |

The electrolysis of sea water is done at the ambient deep sea pressure as shown in FIG. 5. This allows one to create and store compressed hydrogen without having to expend energy for compressing it. Considering electrolysis at a depth of approximately 4 km, i.e. approximately 400 atmospheres pressure, the Hydrogen created through electrolysis of sea water would be emitted through the Solenoid-Valve

[6] which opens when the hydrogen bubble reaches the bottom of the Gas Separation Ridge [3]. The valve would close when the water level reaches to the top. The solenoid valve as well as the sensors and control for closing and opening the valve at appropriate levels are commercially available. The released hydrogen has the physical properties as described in Table 2, and is at a compression level suitable for use in transportation or industry.

An alternative embodiment allows the electrolytic cell to build up additional internal pressure by forcing electrolysis within a sealed space. As shown in FIG. 4, the electrolysis is within a constrained volume. Converting the entire water into hydrogen would compress the hydrogen at approximately 1240 atmospheres pressure as per the ideal gas law at 273K. Using a Pressure Relief Valve [2], the produced hydrogen is harvested at 700 atmospheres. The sealed electrolytic cell is constructed in such a way that the two Spiral Electrode [1] spiral around each other, thereby providing increased surface area for electrolysis. Opposite polarity electrodes are separated by a spiral ridge like shape, the Gas Separation Ridge [3] on the bottom surface of the top lid of the electrolytic cell. Water level is prevented from falling below the ridge line in order to prevent mixing of the gases. When water reaches this threshold, additional water is pumped in through a separate inlet at 700 atmospheres, the opening pressure of the relief valve. This causes the hydrogen to flow out at the same 700 atmospheres pressure through the relief valve until the water level rises to a top threshold level which is chosen so as not to overflow at the normal closing rate of the pumped in water. The pumping of water at high pressure is done with commercially available hydraulic systems, and the high level, low level transitions to drive the water pumping are also done through commercially available control systems.

The electrolysis of sea water and brackish water produces chlorine at the positive electrode. Chlorine liquefies at the operating pressure of the cell. Being heavier than water it shall sink and be discharged through the Cleanout [5]. Continuous depletion of chloride ions makes the remaining solution alkaline thereby suppressing the production of corrosive chlorine at the positive electrode.

Yet another alternative embodiment works by harvesting hydrogen at a pressure of 1000 atmospheres and then transferring it into a waste reducing chamber containing ocean plastics or household waste or other carbon rich waste, as shown in FIG. 6. The hydrogen is heated, approximately to 700K (430 C or 800 F) by the Inline Gas Heater [9]. The mixture is turned, exposed to ultra-violet light to encourage reduction reactions which are endothermic and perform better under catalysis and high pressure. The resulting gas is a mixture of Hydrogen, Methane, Methyl alcohol, Water vapor etc along with some inorganic compounds. This mixture is cooled to 300K and then expanded to 700 atmospheres. By the ideal gas laws, the resulting adiabatic cooling results in the gas being cooled to 210K. This cool gas mixture at −63 C and 700 atmospheres pressure is distilled to extract out the methane which ceases to be gaseous under those conditions. This pathway and embodiment would allow the conversion of oceanic plastic and oil spills, mixed domestic trash and other carbon rich waste into methane gas that can be used in place of natural gas for heating and power.

The various preferred embodiments described previously for the electrolysis cell assembly can be made further energy efficient by using the waste heat of traditional nuclear or thermal power plants to reduce the need for electrical energy required for electrolysis as well as that required for the thermal formation of methane from organic and plastic waste matter.

The Retractable Solar Panel [13] is attached to the device as shown in FIG. 1. The solar panels can be folded and then with a hinge can be turned downwards to go under the water surface when not it use or to protect them from rough seas. This requires the solar panel to have neutral buoyancy, which can be achieved by traditional design methods. The arc of the circle away from the maximum opened state of the solar panels is used to attach Bumper [12] which will protect the solar panels when they are in a closed downward position.

Considering the solar panels of 1000 m$^2$, the energy produced and the cost of solar panels are estimated in Table 3 based on specifications of commercially available products.

TABLE 3

Energy and Cost of Solar Panels

| Component | Description with units (SI) | Value |
| --- | --- | --- |
| Energy Produced | Area of solar panel (sq m) | 1000 |
| | Watts per square meter of solar panel surface (market value) | 220 |
| | Convert to KW/sq m | 0.22 |
| | Peak kilowatts at noon sun above | 220 |
| | Efficiency correction for non noon and latitude (estimated) | 0.3 |
| | Average power (KW) | 66 |
| | Total evergy per day kWH | 1584 |
| | KwH to MJ | 3.6 |
| | Total MJ per day | 5702.400 |
| | Days to fill cylinder | 4.418 |
| | Total cylinders per year | 82.674 |
| Cost | Cost of solar panel household (Dollar per watt peak) | 3.05 |
| | Cost projected for marine solar panel (Dollar per peak watt) | 3.75 |
| | Total peak power we have (Kw) | 220 |
| | Cost of the solar panels (DOLLARS) | 825000 |
| | Life of solar panel (years) (from market values) | 15 |
| | Cost amortized per year ($) | 55,000.00 |

The Retractable Solar Panel [13] is designed with focusing reflective backing, the Focusing Mirror Surface [16] so that some of the sunlight falling on the solar panel is reflected back towards the suspended Sealed Electrolytic Cell [8]. Some of this radiation is converted to electricity by the Overhead Solar Panel [15] which moves to do approximate solar tracking as indicated from FIGS. 1 and 2 This allows the use of solar heat as well as photovoltaic electrical power to perform electrolysis of water. An additional benefit of the reflection is that solar heat instead of falling on the absorbing sea water is reflected away, additionally reducing to a miniscule degree the warming of the ocean. The electrical power generated by the solar cells is also transmitted down to the Open Electrolytic Cell [14] which collects Hydrogen through the Cable [11] but allows Oxygen to bubble away into the sea water.

The device uses currently available electrolytic cell technology for the electrolysis of sea water. Similarly, the transmission of electrical power over 4 km long wires and conversion of voltages to meet electrolytic requirements are also built using standard well known engineering methods. Using 66% as the overall efficiency of electrolysis and power transmission, we arrive at the estimates of Hydrogen production as shown in Table 4.

TABLE 4

Production of Compressed Hydrogen

| Component | Description with units (SI) | Value |
|---|---|---|
| Electrolytic Cell | Energy efficiency of cell and electrical transmission (assumption) | 0.666 |
| | Power being used for electrolysis (kW) | 43.956 |
| | Voltage of electrolysis | 2 |
| | Amperes | 21,978.000 |
| | Faraday constant C per mol | 96,485.333 |
| | moles generated per second | 0.228 |
| | Seconds to fill cylinder | 386,912.926 |
| | Days to fill cylinder | 4.478 |

Using the data in Table 4 and Table 2, it follows that the given embodiment produces over 12000 kg of compressed Hydrogen per year. Solar panels are expected to be the main cost driver of the device. Given the amortized cost estimated in Table 3, it follows that the Hydrogen production cost is projected to close to be $4/kg, which is the ultimate cost target of the US Department of Energy for Hydrogen economy.

TABLE 5

Load Carrying Capacity of Suspension Cable

| Component | Description with units (SI) | Value |
|---|---|---|
| Cable Specification | Diameter per cable (mm) | 3.5 |
| | Redudancy number of cables | 1 |
| | Radius (mm2) | 38.488 |
| | Strength of wire as per spec in PSI | 45,000.000 |
| | Pounds per square mm | 69.750 |
| | Total strength of wire in pounds | 2,684.563 |
| Weight | Lenght of wire = Depth of operation (m) | 4,000.000 |
| | Volume of aluminium (cubic meter) | 0.154 |
| | Density of Al kg/m3 | 2,700.000 |
| | Weight of Al wire (kg) | 415.620 |
| | Weight in pounds | 916.027 |
| | Carrying capacity per wire (lb) | 1,768.535 |
| | Carrying capacity per 3.5 mm kg | 802.421 |
| | Weight of electrolytic cell, assembly to change cylinder and close cylinder when full | 50.000 |
| | Weight of empty cylinder (kg) | 60.000 |
| | Weight of hydrogen at 400 atm (kg) | 177.666 |
| | Total payload weight at depth (kg) | 287.666 |
| | Residual strength/carrying capacity (kg) | 514.754 |

The Cable [11] (FIG. 1) is designed to carry the weight of the Open Electrolytic Cell [14] as well as the electrical wires and gas carrying pipes which are attached to the cable with ties at regular intervals as is done in similar under water applications. The material used in the table is marine anodized aluminum wire/cable alloy T6061, which is an aluminum alloy used for marine applications. The structural feasibility of the solution can be examined by calculating the load on the wire as shown in Table 5.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

A device for electrolytic decomposition of sea water or brackish water into compressed hydrogen and oxygen gases may include: means for maintaining high pressure during electrolysis by using the natural pressure of the gas produced during electrolysis, maintaining separation of the gases produced at the two electrodes, and extracting the produced gases at the said operating pressure, means for in combination, i) filling up water, waste water or brackish water in a manner that separates organic wastes into the hydrogen carrying path, and ii) for detecting current water level and for operating on the existing level to start filling up and to stop filling at appropriate levels, means for minimizing the chlorine production by application of catalytic, thermo-catalytic, or in particular by selectively draining out liquid chlorine which liquefies as a result of the high operating pressure of electrolysis resulting in an increasingly alkaline electrolytic mixture, which in turn suppresses the production of chlorine, finally resulting in the increasing production of oxygen in preference to chlorine at the anode, an electrolytic cell operating at a considerable depth under water at a high static pressure which consumes electrical energy in order to produce hydrogen at the said high pressure by electrolysis of sea water, means in combination for generating the buoyancy required for supporting the weight of an assembly of solar cells as well as additional components of the said device so that it floats on water, for transmitting electrical energy generated by the said assembly of solar cells to other components on the device, and for attaching the said assembly of solar cells as well as additional components on the said device, means in combination for suspending the said electrolytic cell, for storing the produced compressed hydrogen, and for transferring produced compressed hydrogen back to the said storage, means for electrolytic and thermo-catalytic conversion of combinations of waste, water, wastewater, and brackish water into compressed mixture of hydrocarbons and hydrogen in addition to oxygen, filling up water, waste water or brackish water in a manner that separates solid wastes into the hydrogen carrying path, and reacting organic compounds with the produced hydrogen gas under the influence of photo-catalysis, thermo-catalysis, or physical catalysts, using which the said device consumes electrical energy to convert brackish water, waste water, or sea water into compressed fuel worthy hydrogen gas and hydrocarbons at a high pressure.

A device for collecting solar energy may use naturally occurring ocean currents for gathering the solar energy falling over a large geographical area and transporting it to a storage location, with the ability to apply energy efficient navigation in order to stay floating close to a desired trajectory on the ocean currents. The device may include: means for determining the geographical co-ordinates, for determining the physical and meteorological conditions in the neighborhood of the said device, for transmitting these observations to a central control center, and for receiving the navigational instructions from the control center to the said device instructing to take actions in order to correct its location allowing it to revert to its said desired trajectory, a plurality of components submerged at a sufficient depth so as to gain traction from the ocean current, with means for varying the ocean current drag on a submerged payload as per the said instructions; a plurality of components floating on the surface, with means for varying the surface wind drag as per the said instructions; whereby swarms of the said device use the deep ocean currents and surface winds to gather solar energy from over a large area.

A method for producing compressed hydrogen, hydrocarbon gases, and oxygen from waste, waste water, sea water, and their mixtures may include: collecting solar energy with floating solar cells, transmitting the collected energy as a current through connecting wires to a submerged electrolytic cell mounted on a suspension cable, conducting electrolysis of sea water at a considerable depth underwater in order to produce hydrogen and oxygen at high pressure, collecting the produced gases at a high pressure in suitable storage tanks for further use.

A method may include: hydraulically pressing the waste water mixture is into a pressure sealed electrolytic cell so that the waste particles are collected in a manner so that they are exposed only to the hydrogen gas produced at the cathode, applying electrical current to break down the water into hydrogen and oxygen gases resulting in increasing pressure within the sealed electrolytic cell, operating at high static pressure so that the anodic chlorine produced during the electrolysis is in the liquid phase, which in turn being heavier than water sinks to bottom and is collected separately, continuous removal of chlorine increases the alkalinity of the electrolytic solution, which suppresses the chlorine production, releasing the said high pressure within the gases produced by the electrolytic cell using a relief valves which harvest the produced gases at fixed pressure, optionally heating the said collected waste material with the hydrogen produced by the electrolytic reaction in order to generate hydrocarbons, optionally exposing the said collected waste material to ultra-violet containing radiation in the presence of the hydrogen produced by the electrolytic reaction, whereby the waste, waste water, sea water are converted into fuels at high pressure suitable for industrial use without requiring additional energy input for mechanical compression and the waste is reduced to inorganic matter making it easy to recycle or dispose.

What is claimed:

1. A device for collecting solar energy using ocean currents in an ocean for gathering the solar energy falling over a geographical area and transporting the gathered solar energy to a storage location, with the ability to apply navigation in order to stay floating along a predetermined trajectory on the ocean currents, with the device comprising:
   a positioning system configured to determine geographical co-ordinates of the device wherein the geographical co-ordinates are different from the predetermined trajectory;
   a camera and/or sensor configured to determine physical and/or meteorological conditions surrounding the device;
   a transmitter configured to transmit the geographical coordinates and the physical and/or meteorological conditions to a control center;
   an on-board computer configured to receive navigational instructions from the control center to the device to cause the device to take an action in order to correct a location of the device back to the predetermined trajectory;
   at least one submerged component of the device submerged at a depth and configured to vary ocean current drag experienced by the at least one submerged component based on the navigational instructions;
   at least one floating component floating on a surface of the ocean and configured to vary surface wind drag experienced by the at least one floating component based on the height above the ocean surface based on the navigational instructions,
   wherein the at least one submerged component comprises an electrolytic cell configured to electrolyze sea water into hydrogen gas and oxygen gas, wherein the electrolytic cell comprises an anode and a cathode, wherein the anode and the cathode each form a spiral, wherein the spiral anode is spaced apart from and spirals around the spiral cathode wherein partial separators placed between the spiral anode and cathode keep hydrogen and oxygen gas separate, wherein the hydrogen and oxygen gases are released before bubbles of the gases mix.

2. The device of claim 1, wherein the at least one floating component comprises an assembly of solar cells configured to generate electrical energy from collected solar energy.

3. The device of claim 2, wherein electrical energy generated by the assembly of solar cells is transmitted to the electrolytic cell to electrolyze the sea water.

4. The device of claim 1, wherein the device, by conducting electrolysis of dirty water, further comprises a waste treatment system configured to treat ocean waste collected by the device by reacting it in the electrolytic cell with the hydrogen gas produced by the electrolytic cell in order to form compressed liquefied hydrocarbons.

5. The device of claim 1, wherein the electrolytic cell operates at a pressure configured to liquefy chlorine produced at the anode, wherein the liquefied chlorine being heavier than water is configured to discharge through an outlet arranged proximate a bottom of the electrolytic cell.

6. A system comprising a plurality of the devices of claim 1 floating over an area of the ocean.

* * * * *